UNITED STATES PATENT OFFICE.

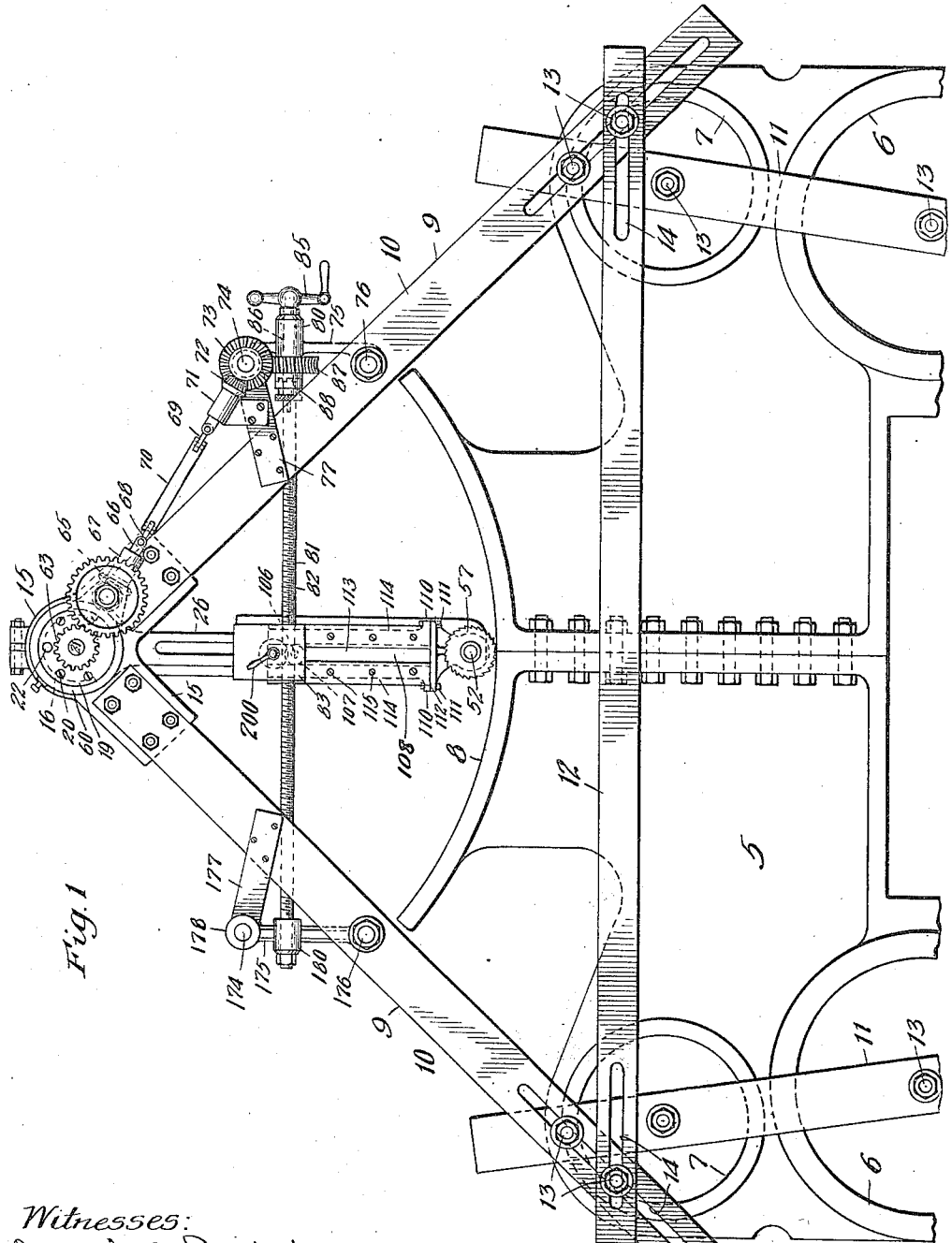

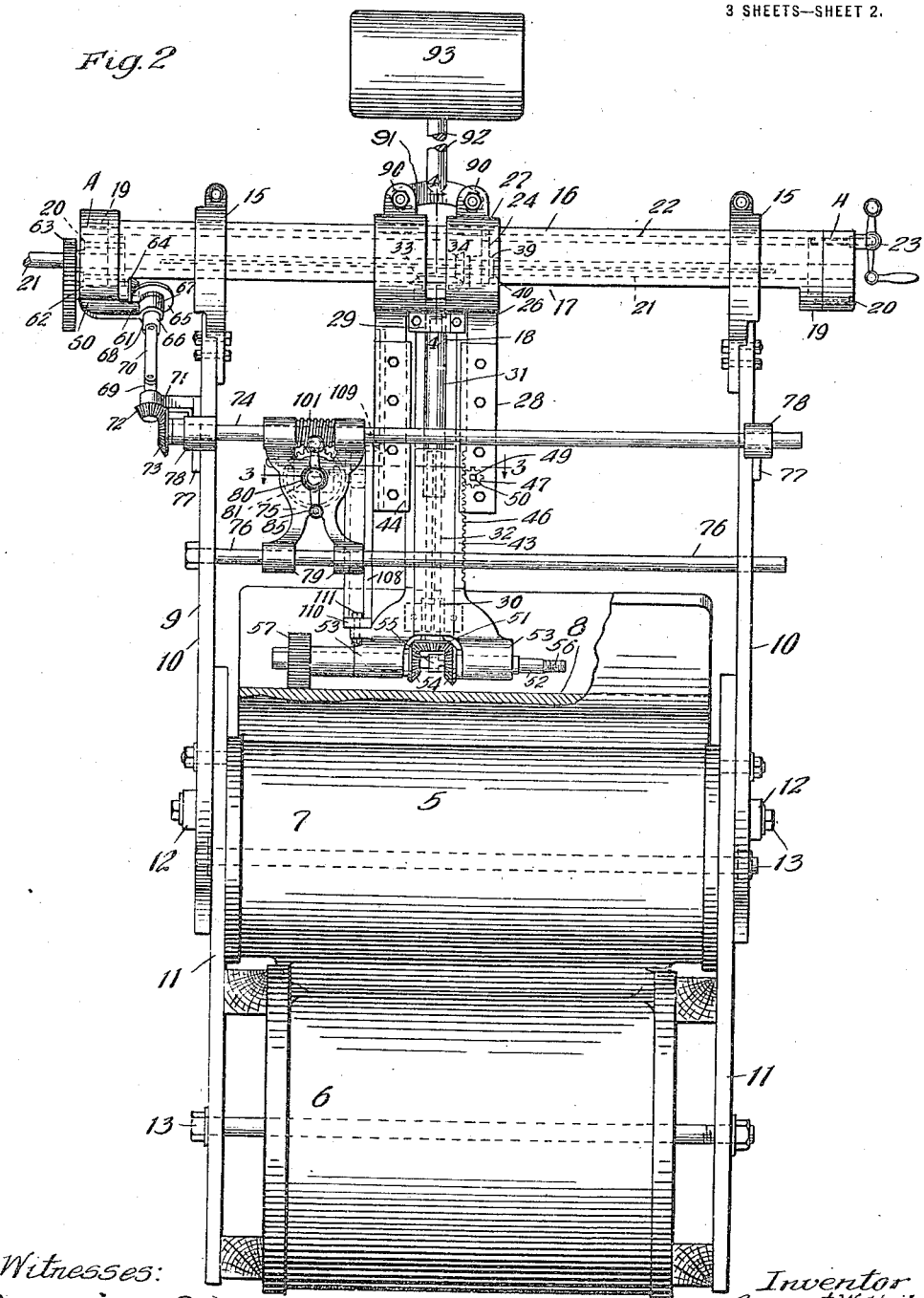

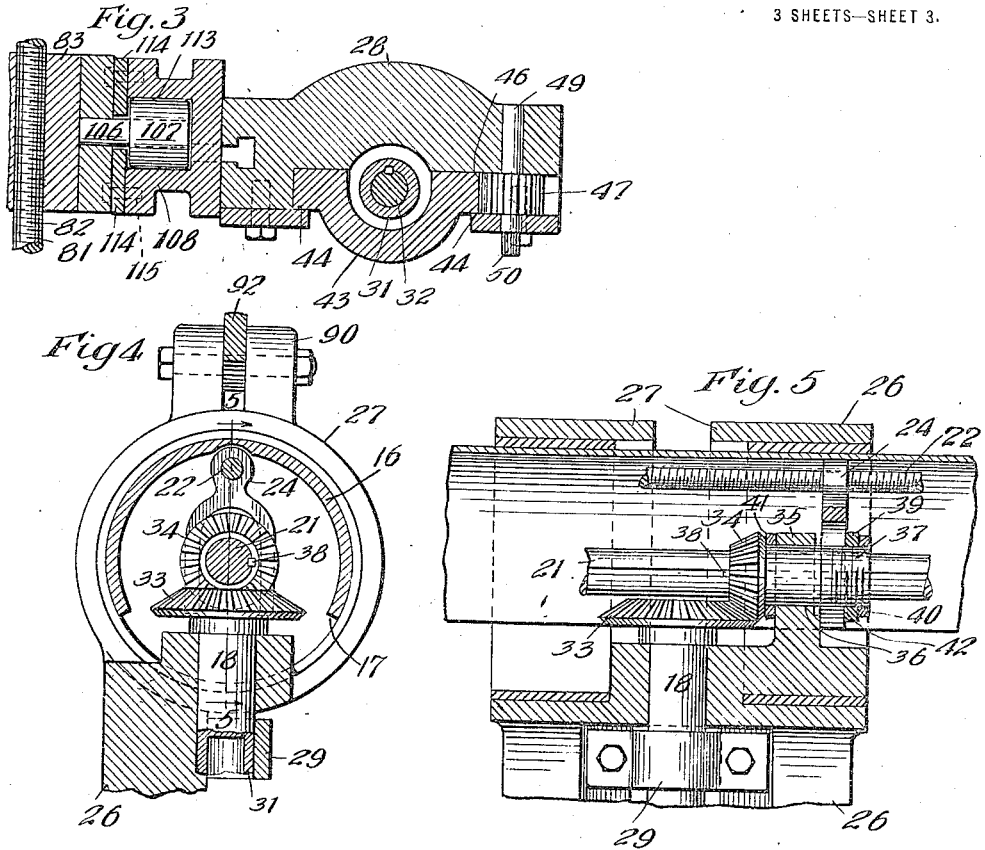

AUGUST W. MEITZ, OF PARSONS, KANSAS, ASSIGNOR OF ONE-HALF TO W. L. KELLOGG, OF PARSONS, KANSAS.

ARC-MILLING MACHINE.

1,293,614.   Specification of Letters Patent.   Patented Feb. 4, 1919.

Application filed October 19, 1916. Serial No. 126,472.

*To all whom it may concern:*

Be it known that I, AUGUST W. MEITZ, a citizen of the United States, residing at Parsons, in the county of Labette and State of Kansas, have invented a certain new and useful Improvement in Arc-Milling Machines, of which the following is a full, clear, concise, and exact description, reference being had to the accompanying drawings, forming a part of this specification.

My invention relates to arc milling machines.

In the particular embodiment of my invention illustrated in the drawings, a machine adapted particularly for the milling of locomotive cylinder saddles is shown.

The object of my invention is to provide a portable milling machine of simple construction and efficient operation.

It will be understood that, in locomotives there is a rigid attachment between the locomotive frame and the boiler at only one point and this where the smoke box of the boiler engages and is secured to the locomotive cylinder saddle. The attachment to the frame at other points is such as to permit longitudinal movement of boiler due to its expansion and contraction under thermal changes. It is important, therefore, that a good fit between the locomotive cylinder saddle and the locomotive boiler be secured. Such fit has, generally speaking heretofore in the locomotive art, been secured by hand chipping of the upper face of the saddle until by rule of thumb, a fit between the boiler and the saddle is approached. Through the employment of my invention, a mathematically perfect fit can be secured. This is only one of the many uses to which my invention can be put, as it will be obvious that it can be employed in any place where a portable or a stationary milling machine for doing arc milling is required.

In the drawings forming a part of this specification, Figure 1 is an end view of the milling machine shown in connection with a locomotive cylinder saddle. Fig. 2 is a side elevation. Fig. 3 is an enlarged detail taken in section on line 3—3 of Fig. 2. Fig. 4 is an enlarged detail taken in section on line 4—4 of Fig. 2. And Fig. 5 is a longitudinal section taken through line 5—5 of Fig. 4, illustrating a detail.

Referring to the drawings, the numeral 5 indicates a locomotive cylinder saddle of a usual type provided with the cylinders 6—6; the steam chests 7—7 and the arcuate boiler bearing face 8. The frame of the milling machine 9 which may be of any suitable type, is, in the particular embodiment of my invention illustrated herein, specially adapted for mounting upon locomotive cylinders and for this purpose consists of the spreader legs 10—10 which are secured to the locomotive cylinders by means of the clamping plates 11—11, the cross braces 12, all secured together by the nuts and bolts 13—13, the legs and braces being provided with suitable slots 14—14 to permit the adjustment of the frame to varying sizes of locomotive cylinders.

At the apex 15 of the spreader legs is mounted a hollow, cylindrical bar 16 which has a longitudinally extending opening 17 at its bottom for the passage of the shaft 18 and fixtures associated therewith, hereinafter described. The said bar 16 is provided at either end with solid heads 19—19. The said solid heads 19 are secured to the ends of the cylindrical bar 16 by suitable means as, for instance, the bolts 20—20. Mounted within the cylindrical bar 16 is a main drive shaft 21 and a traversing feed screw 22. The drive shaft 21 extends at its ends through bearings provided in the solid heads 19 and at one end is suitably extended and provided with necessary driving means such as a pulley, preferably air or electric driven, not illustrated in the drawings. The traversing feed screw 22 is also provided at its ends with bearings as at A, A in said solid heads and at one end thereof is provided with a hand feed crank 23. The driving screw 22 passes intermediate its ends through a horseshoe nut 24. The horseshoe nut 24 is slipped over a hub 35 which is provided upon the swing arm 26, hereinafter more particularly described. The swing arm 26 comprises a housing 27 which rides upon the cylindrical bar 16 and carries a depending upper frame 28 which is provided with a bearing 29 for the upper end of the shaft 18 and the said shaft is mounted at its lower end in another bearing 30. The said shaft 18 comprises a pair of telescoped sections, the upper section 31 being hollow and the lower section 32 being adapted to slide therein. The said shaft, for convenience designated 18, we will at times hereafter refer to as the telescoping shaft 18. The said telescoping shaft 18 is provided at its upper end with a beveled gear 33 which is adapted to intermesh with a similar gear 34, mounted upon a structure associated with the drive shaft 21, which structure we will now particularly describe.

Secured to and preferably integral with the inner portion of the housing 27 is a hub 35. The said hub is provided with a transverse perforation 36, through which passes the drive shaft 21. Within said perforation 36 and surrounding the drive shaft 21 is a collar or gear sleeve 37, the said sleeve being provided at one end with the beveled gear 34, hereinbefore mentioned. The said collar or gear sleeve is made rotatable with the shaft 21 and slidably held thereon by means of the feather key 38. At the end of the gear sleeve opposed to the beveled gear 34 a nut 39 is provided to hold the same in its position in the perforation 36 and the said nut 39 is likewise held against accidental removal by the lock nut 40. The depending arms of the horseshoe nut 24 extend between said nut 39 and the upstanding portion of the hub 35, as clearly illustrated in Fig. 5, and a shoulder 41 is provided on the bevel gear 34 to engage the opposite side of said hub 35, as also shown in said figure. In this way, it is evident that the hub 35 will partake of the movements of the horseshoe nut 24.

Attached to the depending upper frame 28 of the swing arm 26 is the depending lower frame 43. The said lower frame 43 is secured to the upper frame 28 in a manner hereinafter described.

The depending upper frame 28 is provided with a pair of spaced apart guide grooves 44—44. Said guide grooves are shown in cross section in Fig. 3 of the drawings. The lower frame 43 is provided on one edge with the toothed rack 46 which enters one of the guide grooves 44. The frame 28 is provided with a pinion 47 intermeshing with the said rack 43. The said pinion 47 is carried by a short shaft 49 mounted in the frame and having a square headed extension 50 at its outer end adapted to receive thereon a wrench or other suitable tool for revolving the said pinion whereby the lower frame 43 may be moved inwardly or outwardly in reference to the depending frame 28 in order to give the swinging arm 26 its proper radius as desired, as will be hereinafter fully described.

The telescoping shaft 18 is provided at its lower end with a beveled gear 51 which is adapted to drive the transverse milling arbor 52 which is suitably mounted in the lower forked end of the frame 43 through the bearings 53—53 provided thereon. Intermediate the said bearings there is loosely mounted on the said arbor two beveled gears 54—54. Between the said beveled gears 54 there is slidably keyed upon the said arbor 52 a clutch 55 by means of which the arbor may be revolved in either direction to provide for either left or right cutting. The ends of the arbor are provided with suitable means as, for instance, the threads 56 to permit the mounting and securing thereon of a milling cutter 57 which, it will be observed, may be driven left or right to suit the requirements of the work being done. It will also be seen that the milling cutter may be mounted upon either end of the milling arbor 52, and thus work may be done at either end of the locomotive cylinder.

At one end of the cylindrical bar 16 is mounted a bracket 60 having an angular arm 61 thereon. Passing through the said bracket arm is a shaft 62 which is suitably geared at one end to the gear 63 driven from the shaft 21. The gear 63 may be variable in diameter to change as may be desired the speed of the feed. The shaft 62 is provided at its other end with a beveled gear 64, which intermeshes with a beveled gear 65 mounted on a shaft 66 passing through a suitable bearing 67 in the end of the angular arm of said bracket. The shaft 66 is provided with two knuckle joints 68 and 69, respectively, and an intermediate short section 70 providing a universal joint in the said shaft. The said shaft 66 passes at its lower end through a bracket 71 mounted upon one of the spreader legs 10 and its provided at its lower end with a beveled gear 72 intermeshing with a beveled gear 73 upon the worm drive shaft 74. The worm drive shaft 74 is mounted near its ends in bearings 78 carried by brackets 77 secured to the frame 10. Slidably mounted on said shaft 74 is a worm feed slide bracket 75, the latter being forked at its lower end, as indicated at 79, said forked portions 79 being slidable on a stationary rod 76. On the opposite side of the framework corresponding brackets 177 are provided which support a stationary rod 174 corresponding to the shaft 74. Also supported by the opposite side of the frame is another stationary rod 176 corresponding to the rod 76 and slidably mounted on said rods 174 and 176 is another slidable bracket 175 which carries a bearing 180 for one end of the feed screw 81, the opposite end of the feed screw 81 being mounted in a corresponding bearing 80 carried by the slide bracket 75. The said feed screw 81 is provided with the usual threading 82 thereon, passing through the split nut 83. The said split nut 83 is secured to a stud 106 which has mounted on the end thereof a roller 107. Through the medium of said roller 107, connection is made between the feed screw 81 and a slide box 108 which is rigidly secured to the lower end of the swing arm 26. The said slide box 108 is a member having at its upper end a bolt 109 which slidably connects it with the depending upper frame 28 of the swing arm 26 and is provided at its lower end with a pair of lateral flanges 110 which through suitable means, as the bolts 111, are secured to suitable brackets 112 provided upon the lower frame 43 of the swing arm 26. The outer face of the slide box is provided with a groove 113 in which the roller 107 is adapted to have longitudinal movement, the said roller being held against withdrawal from the said groove 113 by means of the detachable guide bars 114 provided on either side thereof. The said guide bars are held in position by suitable means, preferably the screws 115.

The said split nut 83, when closed upon the screw 81, gives the oscillating swinging movement to the swinging arm as the milling cutter traverses the bed being worked upon. The screw 81 is provided at its end with a hand feed crank 85 passing through the feed slide bracket 75 at the point indicated by the numeral 86 in Fig. 1 of the drawings. On the inner side there is provided the worm wheel 87 mounted loosely upon the screw 81 and adapted to be secured thereto in order to revolve the same by the clutch mechanism 88; the said clutch mechanism 88 is adapted to be thrown in or out of gear as will be readily understood. The swing arm 26 is provided above the casing 27 with a pair of lugs 90—90 to receive the ends 91 of the Y-shaped arm 92 upon which is mounted the counter-balance 93 to permit the easy swinging and balancing in such movement of the swinging arm.

The operation is as follows: The portable milling machine is attached to the locomotive cylinders by means of the legs 10—10 and bars 11 and 12, as will be understood. Knowing the radius of the locomotive boiler or that portion thereof which is intended to rest upon the saddle 8, the swing arm which carries the milling tool is adjusted in length to correspond to said radius, this being effected by properly adjusting the two telescoped portions 26 and 31, the parts being held in adjusted position by the gear and rack 47 and 46. During the adjustment of the telescoped arms, it is apparent that the drive shaft 18 will be simultaneously adjusted, at all times maintaining its operative connection with the bevel gear 33. The milling tool 57, which may be applied at either end of the arbor 56, is driven from the drive shaft 21 through the intermediary of the bevel gears 33 and 34 at the upper end of the arm and the bevel gears 51 and 54 at the bottom of the shaft 18. The position of the milling tool transversely of the saddle 8 is adjusted manually by operating the handle 23 which operates the feed screw 22 and the latter through the instrumentality of the horseshoe nut 24 correspondingly shifts the swinging arm. The swinging arm which carries the milling tool is given its circular or oscillating motion through the feed screw 81, the latter being driven through the worm gear 87, worm 101, shaft 74, bevel gears 73 and 72, shafts 66, 70 and 69, bevel gears 65 and 64 and gear 62 driven from the power shaft 21 through the gear 63. When the split nut 83 is clamped on the feed screw 81, it is apparent that the latter will cause the swinging arm to oscillate in the direction of feed of the screw 81 and the latter will at all times remain in a horizontal position, the necessary relatively shifting relation of the feed screw 81 and the swinging arm being compensated for by means of the roller 107 which slides freely up and down the channel or guide-way 113 provided therefor. In this connection, it will be observed that the feed screw 81 which is carried by the slide brackets 75 and 175 is also adjustable transversely of the saddle or framework in conjunction with the similar movements of the swinging arm. When the milling tool has been swung the desired distance by the feed screw 81, the milling tool can be returned to its original or a new starting point by disengaging the clutch 88 and turning the feed screw 81 in a reverse direction by the handle 85, or the split nut 83 can be opened up by manipulating the lever 200 (see Fig. 1) and the swinging arm moved to the position desired whereupon the split nut 83 can be again clamped on the feed screw 81 and the operation repeated.

From the preceding description, it will be seen that the means which I have provided for imparting the oscillating or circulatory movement of the swinging arm, are simple and effective and require a minimum amount of attention from the operator. The milling machine being portable can, of course, be used on different locomotive castings and all the parts are adjustable to thereby adapt the machine for meeting various conditions.

I claim:

1. A portable milling machine for locomotive cylinder saddles and the like, said machine comprising in combination, a framework having an upper longitudinally extending member, two sets of spreader legs adjustably mounted with respect to said upper member, bars adjustably connected with each set of spreader legs, securing means adapted to extend through the cylinders of the saddle casting, and a milling tool operatively carried by said framework.

2. In a portable milling machine of the character described, the combination with a longitudinally extending member, two sets of end frame elements adjustably mounted on said member, and means for detachably securing said frame elements to the work to be operated upon, of a tool-carrying arm supported from said member, mechanism for actuating a tool carried by said arm, and means for imparting oscillating motion to said arm.

3. In a milling machine, a frame, a swing arm mounted upon said frame, a traversing feed screw for imparting movement to said arm upon the frame, a slide bracket mounted on said frame, a screw drive carried by said bracket, a drive box secured to the swing arm, a split nut upon the screw drive, a roller associated with the drive box, a milling tool mounted upon the swing arm, driving means for said tool, the drive box having a longitudinally extending groove to receive the roller and the roller having a stud connecting it to the split nut upon the screw drive, whereby the screw drive imparts an arcuate movement to the milling tool.

4. In a milling machine, a frame including a hollow bar, heads on the ends of said bar, a traversing feed screw passing through said bar and having bearings in said heads, a main drive shaft passing through said bar, a movable milling tool bearing arm mounted upon said bar, a shaft carried by said arm, gears connecting the main drive shaft to the shaft upon said arm, the said hollow bar being provided with an opening for the passage of the shaft carried by said arm.

5. In a milling machine, a frame including a hollow bar, a swinging arm mounted upon said bar, a milling tool carried upon said arm, shafting for operating said tool, a main drive shaft mounted in the hollow bar, gearings connecting said drive shaft with the shafting of the arm, a traversing feed screw mounted in the hollow bar, a horseshoe nut mounted upon the feed screw, the swinging arm being provided with a hub loosely engaged by the horseshoe nut.

6. In a milling machine, a frame including a hollow bar, a swinging arm mounted upon said bar, a milling tool carried by said arm, a shaft mounted on said arm to drive the milling tool, a drive shaft mounted in the hollow bar, a driving gear upon said drive shaft, a driven gear connected thereto mounted upon the shaft of the swinging arm, a hub secured to the swinging arm, a traversing feed screw mounted in the hollow bar, the drive shaft passing through the hub, the hub being provided with shoulders and the traversing screw having a horseshoe nut, the said nut being received between the shoulders upon said hub.

7. In a milling machine, a frame, a bar therein, a swinging arm carried by said bar, a traversing feed screw for moving said arm along said bar, a slide bracket carried on said frame, a worm feed carried by said slide bracket, the slide bracket paralleling in its movement the said bar, the worm drive being mounted transversely of said bar, the said worm drive being connected to the swinging arm to give swinging movement thereto.

8. In a machine of the character described, the combination with a supporting frame, of an arm adjustable as to length swingingly mounted on said frame, said arm being adapted to carry an operating tool, mechanism for transmitting driving power to said tool on the arm, and means for imparting swinging movement to said arm and including a feed screw, the perpendicular distance from the feed screw to the axis about which said arm swings being always constant.

9. In a machine of the character described, the combination with a supporting frame, of an arm adjustable as to length swingingly mounted on said frame about a horizontal axis, said arm being adapted to carry an operating tool thereon, mechanism for transmitting power to the tool carried by said arm, and means for imparting swinging movement to said arm, said means including a feed screw always extending horizontally, said feed screw being adjustable as an entirety horizontally parallel to the axis about which said arm swings.

10. In a machine of the class described, the combination of a frame, a tool-carrying arm mounted on said frame to oscillate about a horizontal axis, and mechanism for transmitting power to operate a tool carried by the end of said arm, said mechanism including a driving shaft extending lengthwise of the arm, of means for imparting oscillating movement to said arm, said means including an element extending horizontally, and a traveling connection between said element and said arm.

11. In a machine of the class described, the combination with a frame, a tool-carrying arm oscillatably mounted on said frame, means for adjusting said arm in a direction parallel to the axis about which it oscillates, and mechanism for transmitting power to a tool carried by said arm, of means for oscillating said arm about its axis, said means including an element having a fixed relation with respect to said axis, said element being also adjustable in a direction parallel to said axis.

12. In a machine of the class described, the combination with a frame, of an arm oscillatably mounted on said frame, said arm being adjustable as to length, a tool carried on the free end of said arm adapted to work on surfaces extending parallel to the axis about which the arm oscillates, and mechanism for transmitting power to drive a tool carried at the end of said arm, said arm being also adjustable in a direction parallel to the axis about which it oscillates, of means for imparting an oscillating movement to said arm, said means being also adjustable in a direction parallel to the said axis.

13. In a machine of the class described, the combination with a portable framework adapted to be attached to the work being operated upon, an arm oscillatably mounted on said frame-work and adapted to carry a tool at the free end thereof, said arm being adjustable as to length, means for adjusting said arm in a direction parallel to its axis of oscillation, of means for imparting oscillating movement to said arm and adjustable in a direction parallel to said axis.

14. In a machine of the class described, the combination with a frame, a tool-carrying arm oscillatably mounted on said frame about an axis, and mechanism for transmitting power to a tool carried at the free end of said arm in all positions of the latter, of means for imparting oscillating movement to said arm, said means including a feed screw, the perpendicular distance from which to said axis remains constant, and a slidable connection between said feed screw and said arm.

15. In a machine of the class described, the combination with a portable framework adapted to be attached to the work being operated upon, said framework including a bar, of a tool-carrying arm swingingly mounted upon said bar, said arm being adjustable lengthwise of the bar, a feed screw for imparting oscillating movement to said arm, connections between said feed screw and said arm, and brackets in which said feed screw is mounted, said brackets being slidable in a direction parallel to said bar.

16. In a machine of the class described, the combination with a portable framework adapted to be attached to a locomotive saddle, said framework including a horizontally extending bar near the top thereof, of a swinging arm depending from said bar and adjustable lengthwise of the latter, said arm being adapted to carry a milling tool at the lower free end thereof, mechanism for transmitting power to a tool so carried, a horizontally disposed feed screw extending transversely of the arm, said feed screw being slidably mounted in a direction parallel to said bar.

17. In a machine of the character described, the combination with a frame, a telescoped sectional tool-carrying arm swingingly mounted on said frame, and mechanism for transmitting power to a tool carried by the free end of said arm, of a power driven feed screw carried by said frame and extending transversely of said arm, said feed screw always bearing a fixed relation with respect to the axis about which said arm swings, and a sliding connection between said feed screw and said arm.

In witness that I claim the foregoing I have hereunto subscribed my name this 10th day of October 1916.

AUGUST W. MEITZ.

Witnesses:
JOSEPH HARRIS,
ELIZABETH M. BRITT.

Copies of this patent may be obtained for five cents each, by addressing the "Commissioner of Patents, Washington, D. C."